United States Patent

Shull

[11] 3,960,422
[45] June 1, 1976

[54] PROCESS FOR MANUFACTURING A HELIUM METAL VAPOR LASER TUBE

[75] Inventor: William A. Shull, Portola Valley, Calif.

[73] Assignee: Liconix, Mountain View, Calif.

[22] Filed: Aug. 5, 1974

[21] Appl. No.: 494,892

[52] U.S. Cl. .................................. 316/19; 316/20; 316/21; 316/22; 331/94.5 G
[51] Int. Cl.² .......................................... H01J 9/18
[58] Field of Search ............................ 316/20–22, 316/24, 26, 17, 18, 19; 331/94.5 D, 94.5 G, 94.5 T

[56] References Cited
UNITED STATES PATENTS

| | | | |
|---|---|---|---|
| 2,844,433 | 7/1958 | Meyer et al. | 316/22 |
| 3,466,567 | 9/1969 | Neusel | 331/94.5 T |
| 3,492,598 | 1/1970 | MacNair | 316/22 |
| 3,624,548 | 11/1971 | Sonowski | 331/94.5 T |
| 3,683,295 | 8/1972 | Hernqvist | 331/94.5 D |
| 3,720,877 | 3/1973 | Zarowin | 331/94.5 G |
| 3,730,606 | 5/1973 | Hernqvist et al. | 316/19 |
| 3,731,227 | 5/1973 | Rosenberger et al. | 331/94.5 T |
| 3,740,110 | 6/1973 | Horton et al. | 316/21 |
| 3,748,595 | 7/1973 | Rigden | 331/94.5 G |
| 3,759,602 | 9/1973 | Walter et al. | 316/20 |
| 3,860,310 | 1/1975 | Hochuli et al. | 316/26 |

*Primary Examiner*—Roy Lake
*Assistant Examiner*—James W. Davie
*Attorney, Agent, or Firm*—Boone, Schatzel & Hamrick

[57] ABSTRACT

A process for manufacturing helium metal vapor laser tubes having an extended life characteristic. Three main areas of processing are presented which extend the life expectancy of a helium metal vapor laser tube. The first area of processing is directed to a time bake under vacuum of the tube to be used; the second is directed to the melting of the metal in an argon atmosphere; and the third area is directed to a final burn-in procedure of the helium metal vapor laser using the manufactured helium metal vapor tube.

17 Claims, 4 Drawing Figures

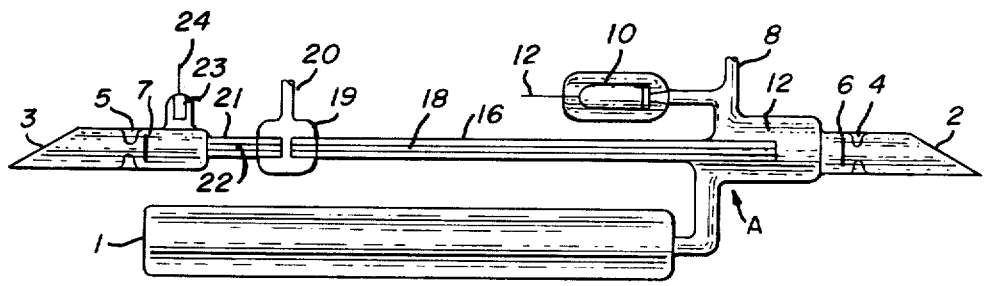
Fig_1
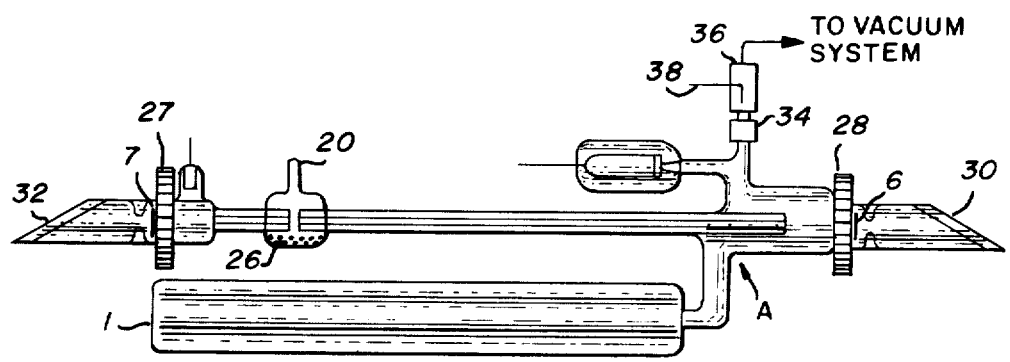
Fig_2
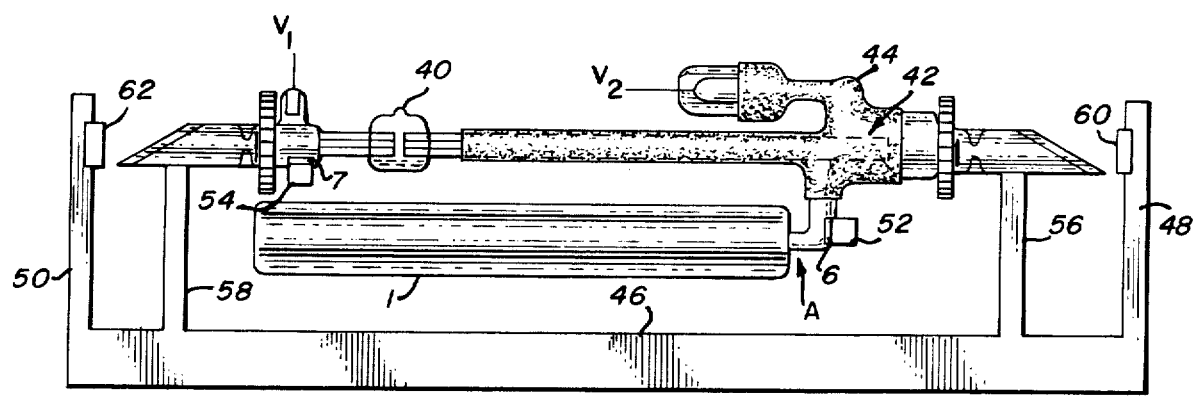
Fig_3

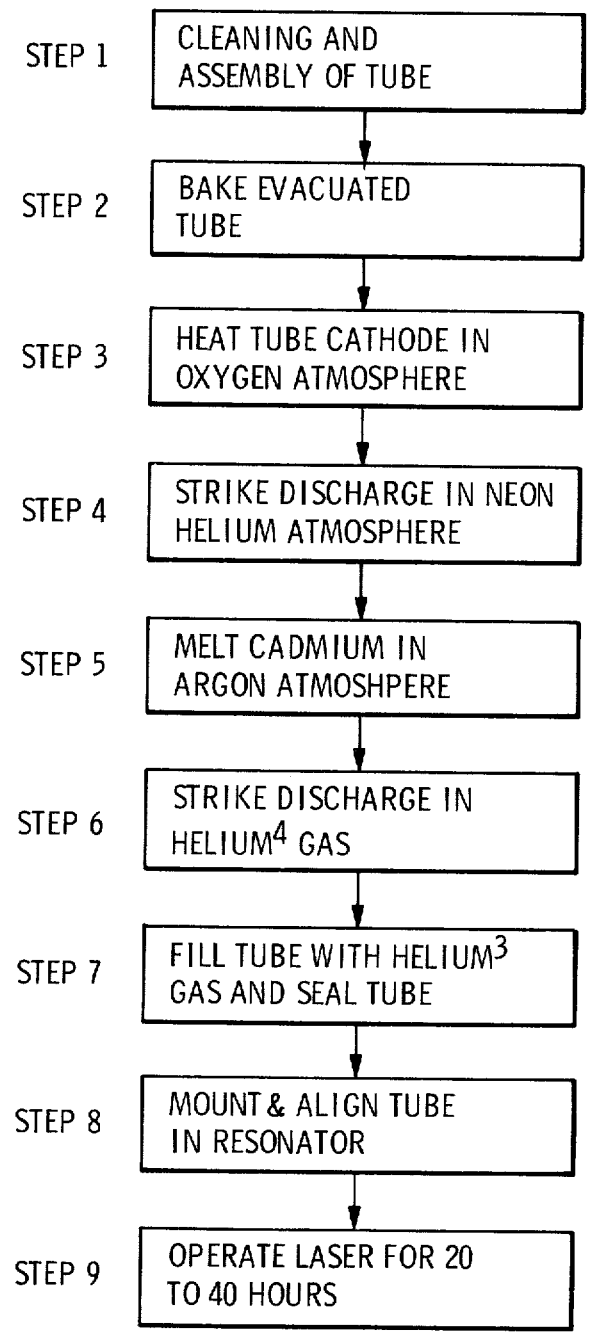
Fig_4

PROCESS FOR MANUFACTURING A HELIUM METAL VAPOR LASER TUBE

BACKGROUND OF THE INVENTION

1. Field of the Invention

This invention relates to a method for manufacturing a helium metal vapor laser tube.

2. Description of the Prior Art

The state of the prior art, as to helium cadmium lasers, is exemplified by the article "Simplified Low Noise Helium Cadmium Laser With Segmented Bore" by W. T. Silfvast and L. H. Szeto, *Applied Physics Letters*, Vol. 19, No. 10, pgs. 445–447, Nov. 15, 1971. That article describes the use of segmented bores to obtain a low noise helium cadmium laser and indicates that when a single cadmium element is used and positioned near the anode, a uniform cadmium density over the entire bore region cannot be obtained through cataphoresis pumping. The article further notes that when instabilities occur near the cadmium source, the instabilities tend to propagate over the entire length of the discharge tube, thereby causing large fluctuations in laser output signals. Based upon these observations, the article recommends the use of a plurality of cadmium elements segmented throughout the bore so as to overcome the fluctuation problem.

In addition, U.S. Pat. No. 3,755,756, entitled "Gaseous Laser Employing A Segmented Discharge Tube" by W. T. Silfvast, generalizes the specific teachings of the above-described article and describes the use of the segmented bore structure to overcome the disadvantages of a single cadmium source.

Other prior art descriptions of helium cadmium lasers are included in articles entitled "Efficient CW Laser Oscillation At 4416°A in Cadmium (II)" by W. T. Silfvast, *Applied Physics Letters*, Vol. 13, No. 5, pgs. 169–171, Sept. 1, 1968 "Cataphoresis In The Helium Cadmium Laser Discharge Tube" by T. P. Sosnowski, *Journal of Applied Physics*, Vol. 40, No. 13, pgs. 5138–5144, December 1969, "Discharge Current Noise In Helium Neon Laser And Its Suppression", by Takeo Suzuki, *Japanese Journal of Applied Physics*, Vol. 9, No. 3, Mar. 1970, "Helium Clean-Up In The Helium-Cadmium Laser Discharge" by T. P. Sosnowski and M. B. Klein, *Journal of Quantum Electronics*, Vol QE-7, No. 8, August 1971, pgs. 425–426.

The teachings as to helium-cadmium lasers are representative of the state of the art of other helium metal vapor lasers.

SUMMARY OF THE PRESENT INVENTION

It is therefore an object of this invention to provide a novel method of manufacturing a helium metal vapor discharge tube which uses only a single metal source and provides for a stable output and an extended life characteristic.

The process contains three major areas which singly and in combination extend the useful life of the helium metal vapor laser tube. The first processing area is directed toward steps for baking the tube after assembly for a period greater than ten hours under vacuum and at a temperature less than the sublimation temperature of the metal used. The second area of processing is the melting of the metal in the metal reservoir while the tube is filled with argon. The third area of processing is the final burn-in procedure wherein the manufactured tube is mounted in a resonator and operated for a period of 20–40 hours.

An advantage of this process is that it allows for the manufacturing of helium metal vapor laser tubes having extended life expectancies which may extend to more than 1,000 usable hours.

Another advantage of this process of manufacturing is that the resulting helium metal vapor laser tube is characterized by low noise and a stabilized output.

Another advantage of this process is that the tube may be of simple construction and of low cost.

The foregoing and other objects, features and advantages of the invention will be apparent from the following, more particular, description of the preferred embodiment of the invention as illustrated in the accompanying drawings.

IN THE DRAWING

FIG. 1 is a side elevational view of a helium metal vapor laser tube in its basic form;

FIG. 2 is a side elevational view of an assembled helium metal vapor laser tube connected to a vacuum system for further processing;

FIG. 3 is a side elevational view of a completed helium metal vapor laser tube mounted in a resonant chamber forming a helium metal vapor laser for final processing; and FIG. 4 is a flow diagram showing the nine major steps of the process for manufacturing helium metal vapor laser tubes.

DETAILED DESCRIPTION OF THE PREFERRED EMBODIMENT

The process for manufacturing a helium metal vapor laser tube of the invention begins with selecting a tube which has been developed through the glass-blowing stage. A selected tube A, as shown in FIG. 1, is comprised of a gas ballast 1, a pair of window mounting surfaces 2 and 3, a pair of diffusion traps 4 and 5, a pair of shields 6 and 7, a vacuum port 8, a barium strontium carbonate cathode 10 having cathode lead 12 extending to the exterior, a tube 16 forming a bore 18 therein, a metal reservoir 19 having metal filler tube 20 extending therefrom, a cataphoretic shield 21 forming a bore 22, and a tungsten anode 23 having an anode lead 24 extending therefrom to the exterior.

The selected tube A, in completing the manufacturing process is passed through nine major steps. FIG. 4 is a flow diagram illustrating the major steps within the process. Each of the major steps will be discussed in detail and are comprised of a series of substeps. The process will be described using cadmium, however, other metals may be used in the process. These other metals include cadmium, selenium, zinc, tellerium and other low temperature high vapor pressure metals.

Step 1 - Cleaning and Assembly of Tube

The tube A, when received from the glass-blower, is first examined for assurance that the window angles and orientation of the surfaces 2 and 3 are proper and that the bore 18 of the tube 16 and the bore 22 of the cataphoretic shield 21 are of the proper size and aligned. The tube A is then cleaned to remove all dust particles. Next, the tube A is air-baked at approximately 250°C for approximately ½ hour so as to remove water vapor from within the tube A. After the tube A cools, three grams of cadmium shot 25 are placed in the metal reservoir 19, through the metal filler tube 20. As illustrated by FIG. 2, a pair of radial heat sinks 27 and 28 is then placed on the tube A. (NOTE: The numeral designations of FIG. 1 are not repeated in FIG. 2.) A pair of Brewster windows 30 and 32 are attached to the window surfaces 2 and 3, respectively. It is necessary to take precautions for cleanliness throughout the procedure. The tube A is next connected to a vacuum system (not shown) through the vacuum port 8 by means of a vacuum clamp 34 and a vacuum tube 36 of the vacuum system. During various steps of the process, the vacuum port 8 is used for the purpose of evacuating the tube A and for inserting various gases. Also, as hereinafter discussed, the tube 36 has an electrode 38 extending to the exterior.

The shields 6 and 7 are held in place in front of the openings of the diffusion traps 4 and 5, respectively, so as to prevent the forming of any films on the inside surfaces of the Brewster windows 30 and 32. The shields 6 and 7 are comprised of magnetic material and are held in place by magnets (not shown) positioned outside of the tube A. The final substep within this major step of cleaning and assembly of the tube is the sealing off of the metal filler tube 20. The filler tube 20 is sealed off at the top most position to prevent the heat from effecting the cadmium shots 26 in the metal reservoir 19. Accordingly, FIG. 2 illustrates the status of the helium metal vapor laser tube as of the end of this first major processing step.

Step 2 - Bake Evacuated Tube at 100°C for 12 hours

The tube A is next evacuated to a pressure of less than $5 \times 10^{-5}$ Torr. Heater tapes are wrapped around portions of the tube and the entire tube is covered with aluminum foil. Next, the tube is baked for a period greater than 10 hours at a temperature that is less than the sublimation temperature of the cadmium shots 26 within the cadmium reservoir 19. Vapor pressure curves of cadmium which illustrate the variation of vapor pressure with respect to temperature are found in Rosebury, *Electron Tube and Vacuum Techniques*, Addison-Wesley (1965) at page 143. Experiments have shown that a temperature of 100°C for a period greater than 12 hours is sufficient to obtain the desired results of enhancing the useful life of the helium metal vapor laser tube. It should be noted that the cadmium temperature must be kept lower than its sublimation point during this process. It is realized that if caution is taken to keep the cadmium shot 26 below its sublimation temperature, that the overall temperature of the rest of the tube might be raised and that the bake period could be less than 10 hours. However, as a general rule, a bake period of greater than 10 hours has been found to be required.

Step 3 - Heat Tube Cathode In Oxygen Atmosphere

After the tube A has cooled off from its bake operation of Step 2, all foils and heating tapes are removed. The tube is then backfilled (at a slow rate) with 0.5 Torr of oxygen. A voltage is applied between the cathode lead 12 and the lead 38 to cause the cathode 10 to be heated such that the barium strontium carbonate cathode material is transformed into barium oxide and strontium oxide. The tube A is then cooled, and evacuated to a pressure less than $5 \times 10^{-5}$ Torr.

Step 4 - Strike Discharge In Neon Helium Atmosphere

This step removes moisture remaining in the bores 18 and 22 as well as any other moisture within the tube A. The tube is first backfilled with 300 microns of neon plus a quantity of helium[4] such that the total pressure within the tube is 3 Torr. Voltage is applied across the anode lead 24 and the cathode lead 12. A discharge then begins. The current flowing through the tube at this time is held to 20 milliamperes. This step should continue until the blue-color discharge in the tube is gone and the entire tube glows a reddish color. The normal time for this step is approximately 15 minutes.

The tube is then cooled and evacuated again to a pressure less than $5 \times 10^{-5}$ Torr.

Step 5 - Melt Cadmium In Argon Atmosphere

The tube is next backfilled with 12 Torr of argon. Heat sinks are clamped on both sides of the metal reservoir 19. It is highly desirous to melt the cadmium shot 26 and to prevent the cadmium from depositing on surfaces within the tube. Heat sinks are placed on both sides of the reservoir 19 during the heating of the cadmium shot 26 within the reservoir 19 to prevent the travel of cadmium vapor through the bores 18 and 22 and other portions of the tube. The interjection of argon into the tube for the heating process has been found to be extremely useful in maintaining and localizing the travel of cadmium atoms, such that the deposition of the cadmium atoms remains nearly entirely within the metal reservoir 19. The metal reservoir 19 is heated at the bottom with a cold flame having no oxygen. After approximately 45 seconds, a small amount of oxygen is added to the flame in order to melt the cadmium. After the cadmium has melted and formed a pool within the bottom of the reservoir 19, the metal filler tube 20 is again sealed off at a point 40 as close as possible to the metal reservoir 19 as illustrated in FIG. 3. The tube is then cooled and the argon evacuated. Finally, the tube should be evacuated to a pressure of less than $5 \times 10^{-5}$ Torr.

Step 6 - Strike Discharge In Helium[4] Gas

The tube is wrapped with asbestos 42 or other insulating material, along the laser tube 16, the cathode 10, the evacuation port 8 and the metal condenser area 12 as illustrated in FIG. 3. The asbestos 42 acts as a thermal blanket and prevents cadmium from depositing within the bore 18 of the tube 16. The cadmium will deposit on the glass area near the ends of the asbestos 35 since that area is cool enough to allow deposition. The tube A is then backfilled with 6 Torr of helium[4] gas. A 50 milliampere current is passed from the cathode 10 to the anode 23 resulting in a bluish discharge within the tube. After 10 minutes the current is increased to 70 milliamperes and run at this rate for a period of 3 hours. This step is the initial burn-in portion of the burn-in cycle of the helium cadmium laser tube.

Step 7 - Fill Tube With Helium[3] Gas And Seal Tube

The tube A is evacuated to a pressure less than $5 \times 10^{-5}$ Torr and then backfilled with helium[3] gas to a pressure of 5.5 Torr. The tube is then heated by again passing current of 70 milliamperes from the cathode 10 to the anode 23. When the tube has been heated, vacuum port 8 is sealed at a point 44 as shown in FIG. 3. The tube is now free of the vacuum system and is allowed to cool.

Step 8 - Mount And Align The Tube In The Resonator

The helium cadmium tube A is then mounted on a resonator 46 which holds a mirror structure 48 and 50 at opposite ends to form the helium cadmium laser. The shields 6 and 7 are removed to positions such that they will not interfere with the discharge path during the laser operation of the helium cadmium laser. The shields 6 and 7 are respectively held in these positions by means of a pair of magnets 52 and 54 respectively. FIG. 3 shows the final structure of the helium cadmium laser comprising the helium cadmium tube. The helium cadmium tube is placed with the resonator 46 and held by a pair of posts 56 and 58. The tube is then aligned with a set of mirrors 60 and 62 such that lasing operation will occur.

Step 9 - Run Laser For 20–40 Hours

Within 1 hour from the completion of Step 7, the helium cadmium laser formed in Step 8 should be turned on. The laser should be operated for a period of time of 20–40 hours. It is interesting to note that during this period of time, fluctuations in power as reported by Silfvast in his referenced articles can be noted. However, as the burn-in period increases in length, the fluctuations decrease and the power output becomes stabilized. While at first it might appear wasteful to have a burn-in period which can be as long as 43 hours, it has been found that by utilizing this long burn-in procedure, the average lifetime of the tube is greater than 1,000 hours of useful output. It has also been noted that during this burn-in period the cadmium within the reservoir 19 will constantly redistribute itself around the entire surface of the cadmium reservoir 19 to form a thin layer of cadmium on the surface of cadmium reservoir 19. This redistribution continues during the operational lifetime of the tube utnil the source of cadmium has been depleted.

In essence, a circular source of cadmium is constantly being formed which acts as a uniform sublimation source. An additional advantage has been found in that depositing the cadmium on the surface of the reservoir 19, results in the cadmium being maintained at approximately the same temperature as that of the reservoir 19 and the reduced occurrence of fluctuations of power due to variations in temperature of the cadmium. Further, the discharge current also heats the cadmium element to supply the cadmium vapor in the bore region of the laser. At the completion of the 20–40 hour burn-in period, the laser is turned off and is ready for distribution and use.

While the invention has been particularly shown and described with reference to a preferred embodiment thereof, it would be understood by those skilled in the art that various changes in form and detail may be made therein without departing from the spirit and scope of the invention.

What is claimed is:

1. A process for manufacturing a helium metal vapor laser comprising the steps of:
   providing a laser tube having a cathode, Brewster windows and a metal reservoir intermediate its ends;
   filling the metal reservoir with metal;
   evacuating said tube;
   baking said tube at a temperature of approximately 100°C for at least 10 hours;
   backfilling said tube with argon;
   melting the metal in the metal reservoir;
   backfilling said tube with helium gas;
   sealing said tube;
   mounting said tube in a resonator to form a laser; and
   aligning said tube in said resonator for lasing operation.

2. A process for manufacturing a helium metal vapor laser as recited in claim 1 wherein during the argon backfilling step the tube is filled to a pressure of at least 12 Torr.

3. A process for manufacturing a helium metal vapor laser tube comprising the steps of:
   providing a laser tube having a metal reservoir intermediate its ends;
   filling the metal reservoir with metal;
   evacuating the tube;
   baking said tube at a temperature of approximately 100°C for at least 10 hours;
   backfilling said tube with argon;
   melting the metal in the metal reservoir;
   backfilling said tube with helium gas;
   sealing said tube;
   mounting said tube in a resonator to form a laser;
   aligning said tube in said resonator for lasing operation; and
   operating said laser within one hour after sealing said tube for a period of 20 to 40 hours.

4. A process for manufacturing a helium metal vapor laser tube as recited in claim 3 wherein said argon is at a pressure of 12 Torr after said argon backfilling.

5. A process for manufacturing a helium metal vapor laser tube as recited in claim 3 wherein said helium[3] gas is at a pressure of approximately 5.5 Torr after said helium[3] backfilling.

6. A process for manufacturing a helium metal vapor laser tube comprising the steps of:
   providing a laser tube having a cathode and a metal reservoir intermediate its ends;
   filling the metal reservoir with metal;
   cleaning said tube;
   attaching said tube to a vacuum system;
   evacuating said tube;
   baking said tube at a temperature of approximately 100°C for at least 10 hours;
   evacuating said tube;
   backfilling said tube with oxygen;
   heating the cathode to form an active cathode surface;
   evacuating said tube;
   backfilling said tube with a mixture of neon and helium[4];
   striking a discharge in said tube to remove water vapor;
   evacuating said tube;
   backfilling said tube with argon;
   melting the metal in the metal reservoir of said tube;
   evacuating said tube;
   backfilling said tube with helium[4];
   striking a discharge in said tube;
   evacuating said tube;
   backfilling said tube with helium[3];
   sealing said tube to remove said tube from said vacuum system;
   mounting said tube in a resonator to form a laser;
   aligning said tube in said resonator for lasing operation; and
   operating said laser within 1 hour after sealing said tube for 20 to 40 hours.

7. A process for manufacturing a helium metal vapor laser tube as recited in claim 6 wherein said tube includes Brewster windows, said process further including the step of raising shields within said tube to protect said Brewster windows prior to said baking step.

8. A process for manufacturing a helium metal vapor laser tube as recited in claim 7 and further comprising the step of:
lowering said shields after said sealing of said tube.

9. A process for manufacturing a helium metal vapor laser tube as recited in claim 6 wherein said tube includes Brewster windows, the metal reservoir includes a filler tube and said filling step includes
depositing metal pellets through the filler tube; and thereafter further comprising the steps of:
providing shields inside said tube to protect the Brewster windows; and
sealing said filler tube near its top.

10. A process for manufacturing a helium metal vapor laser tube as recited in claim 6 wherein all said evacuation steps evacuate said tube to a pressure of less than $5 \times 10^{-5}$ Torr.

11. A process for manufacturing a helium metal vapor laser tube as recited in claim 6 wherein during the oxygen backfilling step the tube is filled to a pressure of 0.5 Torr of oxygen.

12. A process for manufacturing a helium metal vapor laser tube as recited in claim 6 wherein said cathode is comprised of barium strontium carbonate and the cathode is heated sufficient to reduce said barium strontium carbonate to barium oxide and strontium oxide.

13. A process for manufacturing a helium metal vapor laser tube as recited in claim 6 wherein a mixture of 0.3 Torr of neon, and 2.7 Torr of helium[4] is used in the neon/helium backfilling step.

14. A process for manufacturing a helium metal vapor laser tube as recited in claim 6 wherein during the argon backfilling step the tube is filled to a pressure of 12 Torr of argon.

15. A process for manufacturing a helium metal vapor laser tube as recited in claim 6 wherein during the helium backfilling step the tube is filled to a pressure of 6 Torr of helium[4].

16. A process for manufacturing a helium metal vapor laser tube as recited in claim 6 wherein the said helium[4] discharge is maintained for approximately 3 hours.

17. A process for manufacturing a helium metal vapor laser tube as recited in claim 6 wherein said step of sealing said tube comprises the sealing of a vacuum port as close to the main body of said tube as possible.

* * * * *